(12) United States Patent
Duroux et al.

(10) Patent No.: US 6,485,155 B1
(45) Date of Patent: Nov. 26, 2002

(54) MULTIPLEXING MIRROR

(76) Inventors: Bernard Duroux, 19 Domoline de la Boissiere, Garancieres 77890 (FR); Daniel Dumont, Rosa Bonheur, Beneux les Sablons 77250 (FR)

( * ) Notice: Subject to any disclaimer, the term of this patent is extended or adjusted under 35 U.S.C. 154(b) by 0 days.

(21) Appl. No.: 09/900,655

(22) Filed: Jul. 6, 2001

(51) Int. Cl.[7] .............................................. G02B 7/182
(52) U.S. Cl. ...................... 359/877; 359/872; 359/873; 359/843
(58) Field of Search ................................ 359/877, 872, 359/873, 843, 844, 841, 842

(56) References Cited

U.S. PATENT DOCUMENTS

| | | | |
|---|---|---|---|
| 4,881,418 A | 11/1989 | Fimeri | |
| 5,052,792 A * | 10/1991 | McDonough | 359/843 |
| 5,081,586 A | 1/1992 | Barthel et al. | |
| 5,196,965 A | 3/1993 | Lang et al. | |
| 5,793,990 A | 8/1998 | Jirgal et al. | |
| 5,798,575 A | 8/1998 | O'Farrell et al. | |
| 5,900,999 A * | 5/1999 | Huizenga et al. | 248/474 |
| 5,959,367 A | 9/1999 | O'Farrell et al. | |
| 6,008,717 A | 12/1999 | Kawase et al. | |
| 6,175,164 B1 | 1/2001 | O'Farrell et al. | |
| 6,264,338 B1 * | 7/2001 | MacFarland et al. | 359/838 |
| 6,276,808 B1 * | 8/2001 | Foote et al. | 248/472 |
| 6,364,494 B1 * | 4/2002 | King et al. | 359/601 |

* cited by examiner

Primary Examiner—Mohammad Sikder
(74) Attorney, Agent, or Firm—Warn, Burgess & Hoffmann, P.C.

(57) ABSTRACT

A side view mirror including a multiplexor chip, NTC thermistor within the housing. The multiplexor controls multiple functionality from the housing and provides simplified LIN bus connection to the vehicle.

18 Claims, 4 Drawing Sheets

MULTIPLEXING MIRROR

TECHNICAL FIELD

This application relates to multi-featured mirrors, particularly side viewing mirrors for use in side view mirror assemblies for vehicles. Side view mirrors have been increasing complex with more electronic features and functions in them in recent years. For instance, puddle lights, turn signals, electronic controls, heated mirror surfaces, speakers, electrochromic mirrors and electronic folding of mirrors are all features which are commonly found in side view mirrors today.

BACKGROUND OF THE INVENTION

It has become a increasing complex task to provide the proper controls for all of the features and to provide them in a convenient location to the operator of the vehicle. Typically, all multifunctional mirrors feature a wiring harness of somewhat complex proportions having sometimes six, seven or eight wires leading to various functions inside of the mirror housing, all of which must be controlled outside of the mirror housing. This adds complexity to the vehicle assembly where controllers and computer chips must be provided for in the vehicle. This makes mirror functionality and vehicle integration costly, complex and somewhat burdensome from a mirror sales point of view.

Therefore, it has been a goal in the art to provide a less complex, lighter weight, and improved method for controlling mirror functions in a side view mirror.

SUMMARY OF THE INVENTION

In accordance with the present invention, there is provided a mirror having a plurality of control features such as mirror adjustments, fold controls, heating, lighting, memory, turn signals, puddle lamps, electrochromic mirrors, temperature readouts and intercom functions. The mirror of the present invention includes a mirror housing and multiplexing chip contained within the housing. The multiplexing chip includes a three-wire connection to a control interface inside the vehicle for control of the features.

A second aspect of the present invention is that the multiplexing chip is advantageously used to provide a controlled memory position of the mirror surface in the housing. In this respect, a pair of motors are used for controlling and positioning the x and y coordinates of the mirror surface. A signal is read by the multiplexing chip for each rotation of each of the motors. Prior to returning the motors to a preprogrammed memory position, the motors are indexed to a full x or y coordinate endpoint, and thereafter the multiplexor can index the motor to its end position and bring it back to the proper memory position by measuring the turns of the motor. In this manner, if for some reason the mirror has become misaligned, the multiplexing chip will return the mirror to the proper position by this indexing function each time prior to returning to a preprogrammed memory position set forth in the multiplexing chip.

Additionally, the multiplexing chip allows for multiple mirror functionality control with only a 3 wire lead into the vehicle, simplifying controls within the vehicle. Use of the multiplexor within a mirror housing also allows the placement of an NTC or PTC thermistor within the housing, to provide in-housing temperature compensation to the electrical systems such as the mirror motors and to read the outside temperature. This also allows accurate control of the mirror motors via pulse width modulation from the multiplexor chip.

Further understanding of the present invention will be had in view of the description of the drawings and detailed description of the invention, when viewed in conjunction with the subjoined claims.

DETAILED DESCRIPTION OF THE PREFERRED EMBODIMENTS

Figure 1:
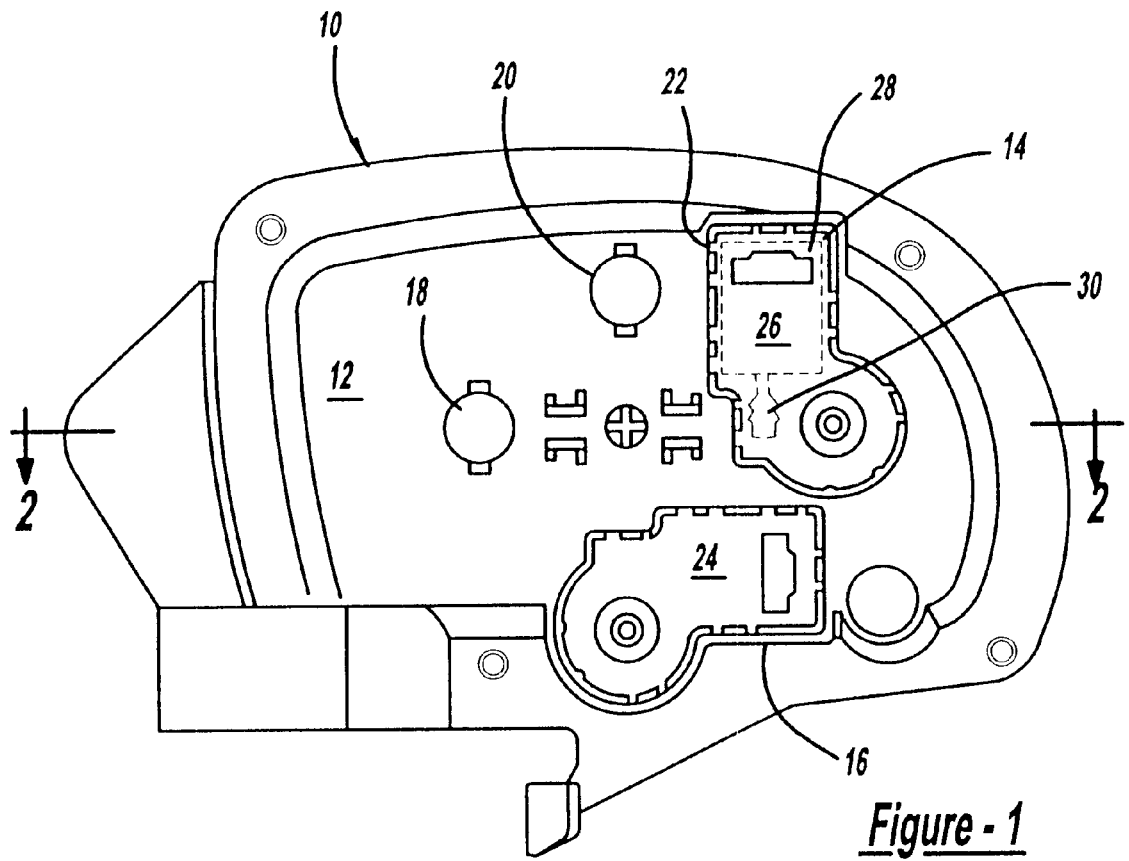
FIG. 1 is a plan view of a mounting plate with two discrete drive assemblies installed the mounting plate.

FIG. 1 is a plan view of the inside of a mirror housing 10 having a mounting plate 12. The mounting plate has a number of recesses 14, 16, 18 and 20 for the fitment of various parts, such as for example a discrete drive assembly 22 (FIGS. 1 and 2) in recess 14 and a like discrete drive assembly 24 (FIG. 1 only) in recess 16.

The discrete drive assembly 22 comprises a cover 26 the uppermost surface of which is housed an electric motor 28 shown in phantom. The motor has a worm screw 30 attached to its output shaft.

Figure 2:
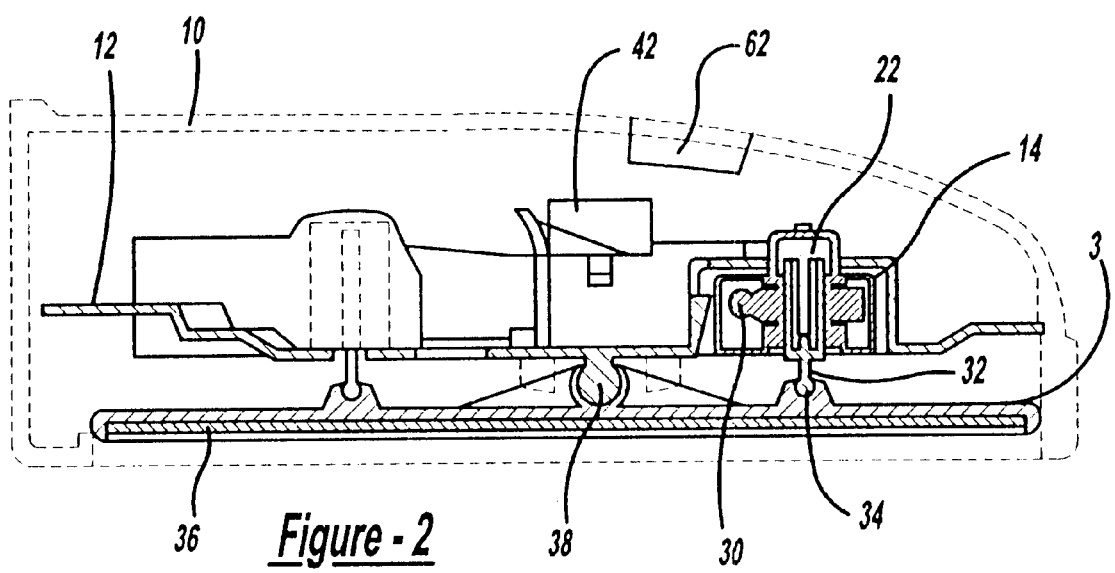
FIG. 2 is a cross-section of a mounting plate and rear view mirror assembly along section 1—1 of FIG. 1.

The worm screw 30 engages with a jacking screw 32 having a ball head 34 at its upper end for engagement with the rear view mirror 36 as depicted in FIG. 2. As the worm screw is moved longitudinally along is longitudinal axis, in and out of the recess 14, the mirror moves about the pivot 38 in an axis orthogonal to the vertical plane lying along the line 1—1 of FIG. 1.

The same arrangement is provided by discrete drive assembly 24 which creates a movement of the mirror about the pivot 38 in an axis orthogonal to the vertical plane lying along the line 2—2 in FIG. 1.

Both electric motors are controlled remotely by the driver of the vehicle and, in some, but not all mirrors, the mirror position is adjusted using only one motor such as mono-axis mirror assemblies. The invention to be described in greater detail is useable with those having one or two position adjusting motors. Such motor positioning systems are shown in U.S. Pat. No. 4,881,418 to Fimeri, issued Nov. 21, 1989, which is hereby incorporated by reference.

As set forth above and in accordance as specified that the present invention is a method for position of the mirror 10. The mirror includes a reflective surface 36 and carrier assembly 38 attached to the mirror surface and is included at least the first motor such as such 26 for adjusting the angular orientation of the mirror by the motor.

Figure 3:
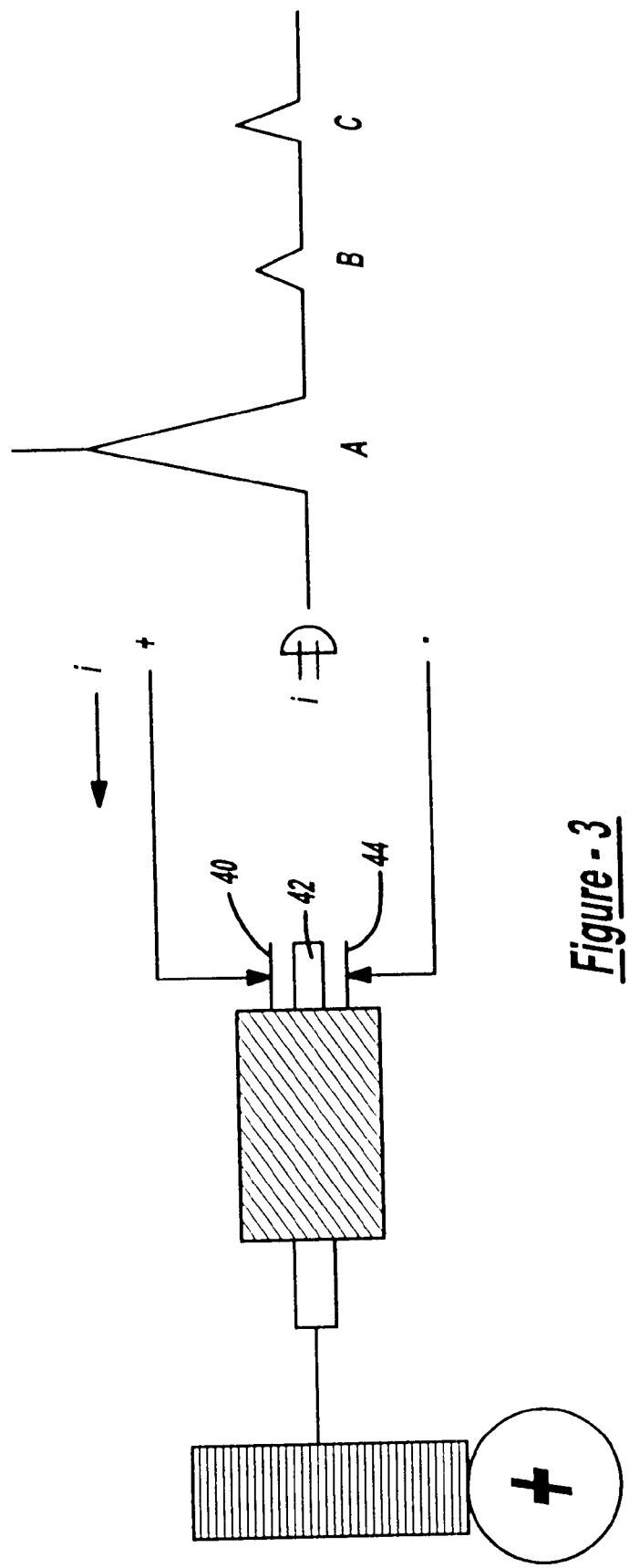
FIG. 3 is a schematic view showing the motor rotational pickup and the and the peak signals read by the multiplexor chip.

The shaft 40 of the motor in FIG. 3 is monitored by measuring the peaks in current as the motor shaft rotates along the brushes 42 and 44. Thus, the number of peaks such as shown at a, b, c, etc. are counted by a multiplexor. Thus, a signal (a, b, c . . . ) for each rotation of the motor shaft is measured. The rotational shaft is measured between a first position and a second position preferably the stop positions on either (preferably both) of the x or y axis of the mirror movement to determine the number of rotations of the shaft (peaks a, b, c . . . ) between the first stop position and the second. In order to provide a proper positioning of the mirror position between the first and second position, a base point for positioning the it mirrors established by driving the motor to a stop at one of the first or second positions and thereafter actuating the motor to a predetermined position between the first and second positions. Each of the motors 24, 26 is actuated this way to provide accurate memory positions for the mirror.

In the present invention, a multiplexing chip 42 is provided which measures the peaks of motors 24 and 26, and allows control of the x and y position of the mirror assembly, in order to allow memory function without any recopy potentiometer.

Figure 4:
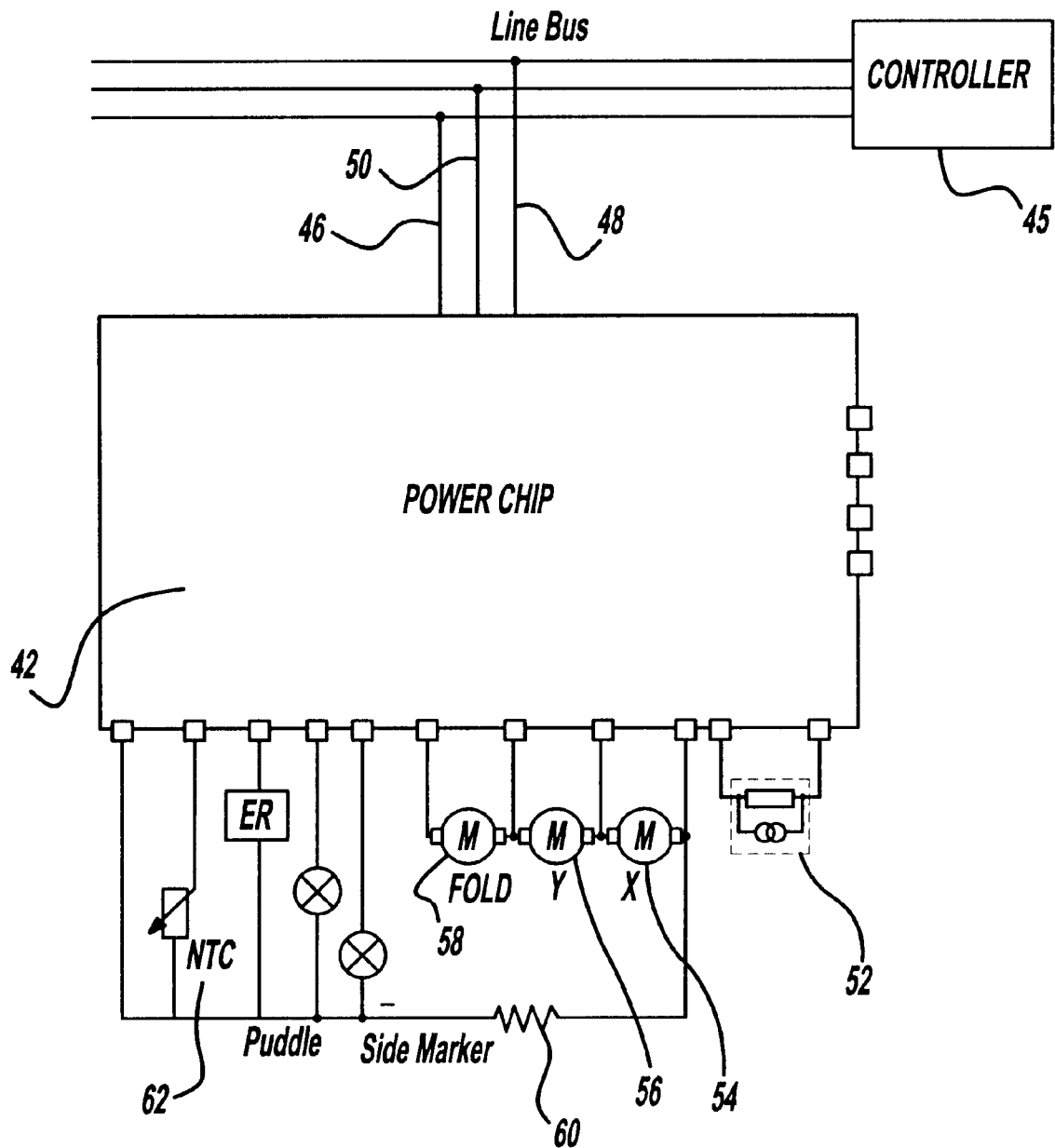
FIG. 4 is a schematic view of the multiplexor chip.

Referring now to FIG. 4, the multiplexing chip is connected to various functional features found in the mirror which are selected from the group of a fold control, heating of the mirror, security lighting, turn signals, stop signals, alarms, intercom functions, light sensors, keyless entry, image capture device, compass, intelligent vehicle highway system, global positioning system, garage door opener, or combinations thereof, and, of course, x and y coordinate positioning of the mirror. The use of the multiplexing chip allows for control of all these functions by way of a serial bus, LIN connection to a controller 45. Thus, because of the use of the multiplexing chip, all of these functions can be controlled by way of a serial input/output line 46 along with a ground line 48. Thus, with the serial bus line 46 in a preferred embodiment, the mirror folding can be controlled as shown at 52. Memory positions can be stored for the x-position 54 and y-position 56 of the mirror surface. Additionally, at 58, the memory fold positions may be provided for purposes of alarms or the like. Mirror heating of the mirror could be controlled such as at 60.

In a preferred embodiment, an NTC thermistor 62 is provided for measurement of temperature. As will be readily appreciated, the thermistor 62 may be linearized by the multiplexor which removes linearization systems outside of the mirror as required in prior art designs. Thus, with the NTC multiplexor combination for specified temperatures, less inputs are necessary and less external control mechanisms are necessary allowing the NTC to be positioned and controlling various temperature sensitive items within the mirror itself. By use of the multiplexor, the NTC output can be linearized and mirror control in accordance with temperature such that the x and y motors provide constant speed no matter what the temperature. Additionally, dual speed mirror fold functions may be provided with the use of the multiplexor.

Additionally, the use of a multiplexor allows for additional functionality to the mirror, such as temperature controlled mirror heating. For instance, in another aspect of the invention, an alarm feature could be connected to the multiplexor. In the alarm feature, if an unauthorized entry is conducted without, for instance, a key sensed in the door lock or a wireless key fob signal sensed, the multiplexor could be programmed to have a flashing light or the light go off and/or provide folding of the entire mirror and lock the entire mirror in the folded position until the key fob is actuated or a key is used in the door. This allows additional security for the vehicle.

In a preferred embodiment, a Motorola power chip with AMP connections is utilized. For instance, a suitable Motorola power chip, Model No. M05Br06 is utilized. Additional functionality is provided in that the logic of a power fold mechanism could be included in the chip which reduces the cost of the power fold mechanism and could be utilized to have two speeds of power fold. The circuit is also configured in an alternate embodiment to be auto diagnostic, providing signals if the components are working incorrectly. Also, with respect to the power fold mechanism, the chip is programmed to sense overcurrent and would allow the power fold to discontinue upon, for instance, hitting an object or the like, and may provide other functionality. Additionally, as set forth above a telecommand module may be connected directly to the power chip for door opening and the like thereby increasing functionality and reducing cost.

A conventional control panel may be utilized for control of the functionality in the mirror. Thus, standard user controls for controlling the mirror angles and the predetermined memory positions are interfaced into the multiplexing chip through the serial bus interface. However, in the present invention, the memory is retained in the mirror itself by way of the multiplexor rather than an external unit within the vehicle. Thus, assembly of the vehicle is advantageously improved.

Figure 5:
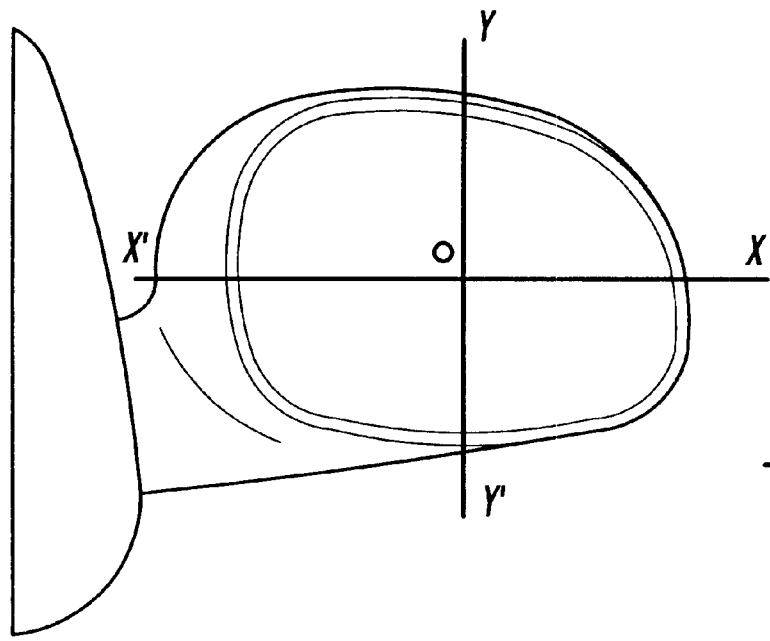
FIG. 5 illustrates a mirror having an x and y axis for use in an alternate embodiment.
Figure 6:
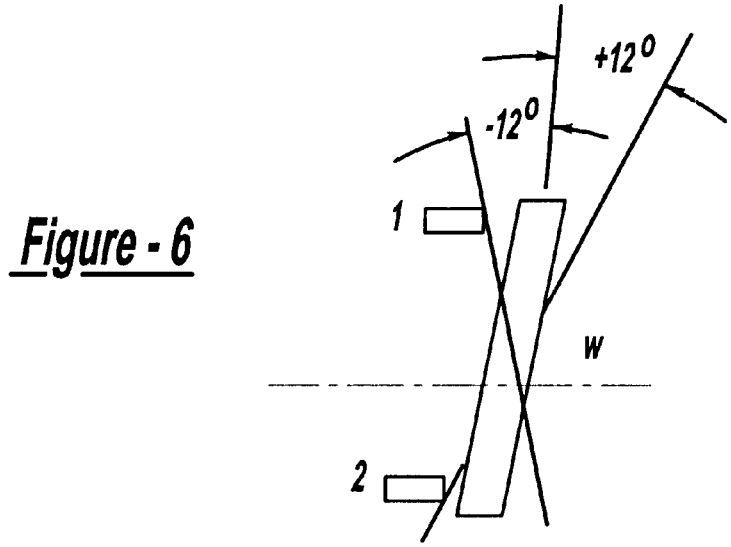
FIG. 6 is a sectional view along axis y—y of FIG. 5.
Figure 7:
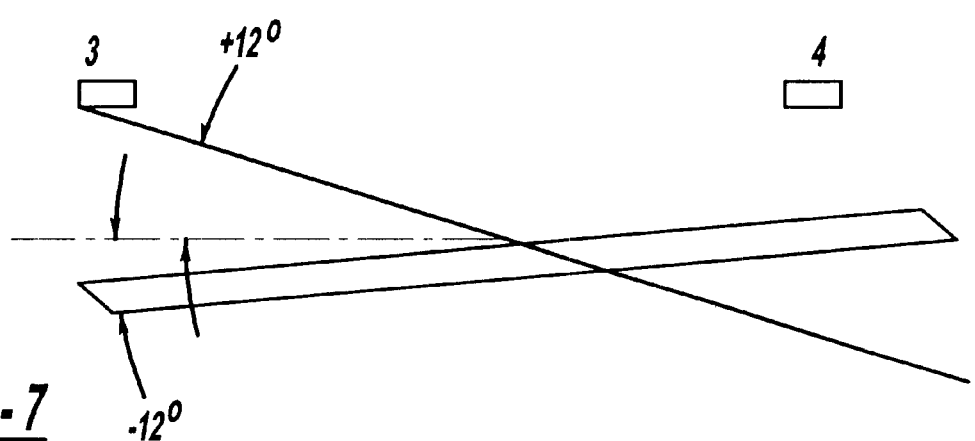
FIG. 7 is a sectional view along axis x—x of FIG. 5.

Referring now to FIGS. 5–7, a method of permanization of the mirror position without the benefit of a separate potentiometer is shown. In this method, the zero position of FIG. 5, Y'OY X'OX may be found by measurement of the ripple current of the electrical motor collector on each axis. In this discussion, y and x represent the number of electrical motor rotations for the distance between steps along Y'OY and X'OX. The stored zero position is $+Y_1$ rotations for the position vector OY and $-Y_2$ for OY'. Similarly, for the position OX, the number of rotations is $+x_1$, and for OX', the number of rotations is $-x_2$.

Most mirrors include override positions which, if the mirror is bumped, will move the position of the mirror and the reference position will disappear since the angles of the mirror are wrong upon impact or movement of the mirror surface. In the subject example, the mirrors may be rotated 12° on either axis. This input is memorized in the chip. Ribs 1 and 2 are provided for limits on the movement for the y position, and stops 3 and 4 provide limits on movement for the determination of the position of x. Thus, in operation, the memorization features always proceed from the midpoint zero position O. The midpoint zero position O is memorized by allowing the mirror first to go to rib 1 and then after going to rib 2 and memorizing the motor rotations. Thus, the middle or zero position is y/2 (designated $y_m$). Thereafter, the mirror is positioned at y and the same positioning is used on the x axis. Thus, the mirror goes to rib 3 and then proceeds to rib 4, and the number of turns is memorized. The midpoint of this is memorized by x/2, which is designated as $x_m$. Thereafter, the mirror repositions itself at $x_m Y_m$ by going to a stop position at the zero position and seeking the memorized position from this zero position.

Thus, the memorized position is always measured from the $x_m Y_m$ position. Each time a memory of the mirror is desired, the mirror positions itself in accordance with this procedure and, thereafter, will measure the mirror prize position from the $x_m Y_m$ position.

In practice, adjustment may be made by a high speed motor to reduce the adjustment time, preferably to less than 5 seconds. In addition, for improving the accuracy of the mirror position and the memory position, dispute of traveling during positioning will be decreased using pulse width modulation of the current to position slightly before the memorized position, wherein the memorized position can be accurately dialed into place. For example, the high speed motor could be used up to about 4° before the memorized position and, thereafter, slowly brought into the proper position in the mirror housing. Thus, using this method, it is not necessary to have a separate potentiometer in the mirror assembly for providing feedback as to the position of the mirror. This reduces the cost of the mirror and provides an accurate positioning system with less inputs. This results in a simplified wiring harness.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A method for positioning a mirror comprising:
    (a) providing a mirror including a reflective surface;
    (b) a carrier assembly attached to said mirror surface, said carrier assembly including a motor having a shaft for adjusting an angular orientation of the mirror by said motor;
    (c) a signal pickup for electrically picking up a signal for each rotation of the motor shaft;
    (d) measuring the rotation of the shaft between a first position and a second position of the mirrors for providing a position index for positioning said reflective surface at any predetermined point between said first and second position; and
    (e) establishing a base point for positioning of said mirror surface by driving the motor to a stop at one of said first and second positions and thereafter actuating said motor along said position index to a predetermined position between said first and second positions.

2. The method of claim 1 further comprising providing a multiplexing chip for providing positioning of the mirror.

3. The method of claim 2 wherein said multiplexing chip stores one or several predetermined positions for said mirror surface in memory.

4. The method of claim 2 further comprising a second motor for adjusting said mirror, wherein said motor and said second motors provide for adjustments in an x and y direction, said multiplexing chip monitoring and memorizing the rotations of the motors for determining position.

5. The method of claim 4 further comprising an NTC thermistor for compensating for temperature variations in the electrical signal.

6. The method of claim 4 wherein said multiplexor also controls mirror functions selected from the group consisting of fold control, heating of the mirror surface, lighting, turn signals, alarms, intercom functions or combinations thereof and wherein said multiplexor includes a wiring harness into a vehicle consisting of three wires.

7. The method of claim 6 wherein said wires include positive power, a negative or ground wire and a serial connection wire.

8. The method of claim 7 wherein said serial connection wire is connected to a controller.

9. The method of claim 8 wherein said multiplexing chip is sealed in a housing and mounted in said mirror housing.

10. A method for positioning a mirror comprising:
    (a) providing a mirror including a reflective surface;
    (b) a carrier assembly attached to said mirror surface, said carrier assembly including a first motor for adjusting the angular orientation of the mirror by said motor;
    (c) a signal pickup for electrically picking up a signal for each rotation of the motor shaft;
    (d) measuring the rotation of the shaft between a first stop position and a second stop position along either a first or second axis and averaging the result to provide a zero position index for positioning said reflective surface at any predetermined point between said first and second position; and
    (e) establishing a base point for positioning of said mirror surface by driving the motor to said zero position, and thereafter actuating said motor to a predetermined position between said first and second positions by advancing the motor from said zero position to said predetermined position.

11. The method of claim 10 further comprising providing a multiplexing chip for providing positioning of the mirror.

12. The method of claim 10 wherein said multiplexing chip stores one or several predetermined positions for said mirror surface in memory.

13. The method of claim 10 wherein a second motor is provided for adjusting said mirror, said first and second motors providing for adjustments in an x and y direction, said multiplexing chip monitoring and memorizing the rotations of the motors for determining position, and wherein said zero position is established on both axes.

14. The method of claim 13 wherein an NTC thermistor is used to compensate for temperature variations in the electrical signal.

15. The method of claim 13 wherein said multiplexor also controls mirror functions selected from the group consisting of fold control, heating of the mirror surface, lighting, turn signals, alarms, intercom functions or combinations thereof and wherein said multiplexor includes a wiring harness into a vehicle consisting of three wires.

16. The method of claim 15 wherein said wires include positive power, a negative or ground wire and a serial connection wire.

17. The method of claim 16 wherein said serial connection wire is connected to a controller.

18. The method of claim 17 wherein said multiplexing chip is sealed in a housing and mounted in said mirror housing.

* * * * *